Feb. 24, 1959  C. R. BELTZ  2,874,549
PORTABLE ICE SKATING RINK AND METHOD OF MAKING THE SAME
Filed May 19, 1954  2 Sheets-Sheet 1
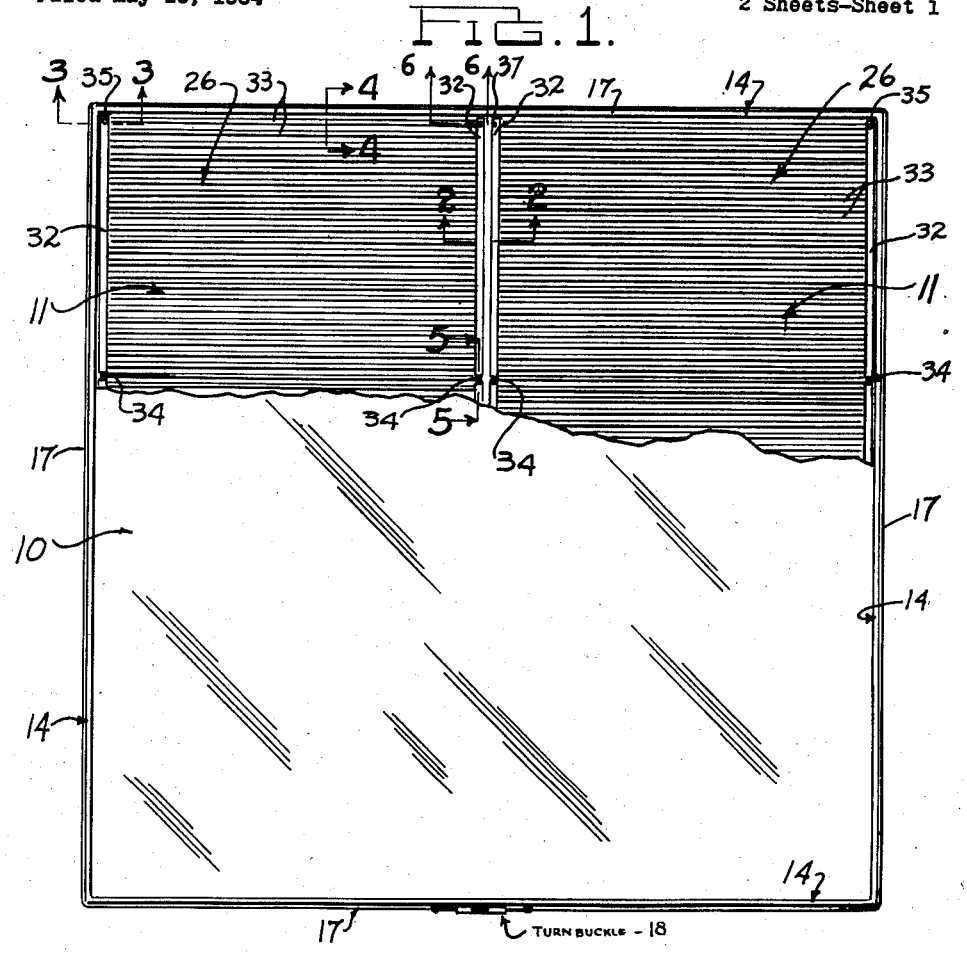
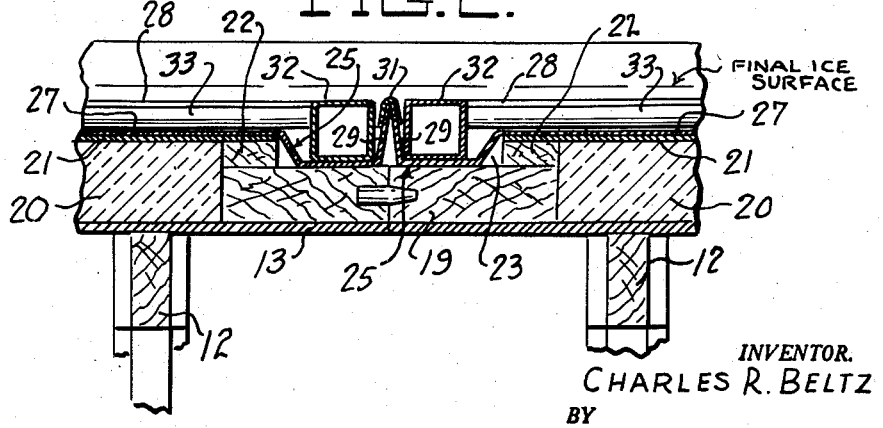
INVENTOR.
CHARLES R. BELTZ
BY
Whittemore, Hulbert & Belknap Feb. 24, 1959 C. R. BELTZ 2,874,549
PORTABLE ICE SKATING RINK AND METHOD OF MAKING THE SAME
Filed May 19, 1954 2 Sheets-Sheet 2
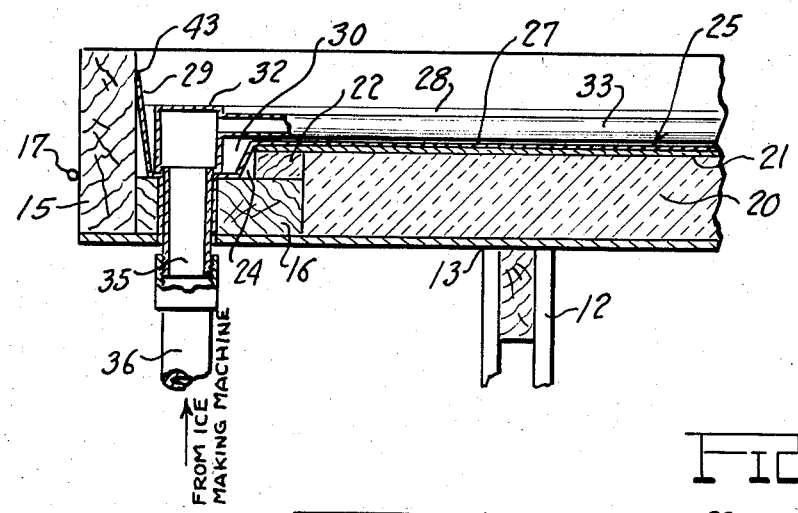
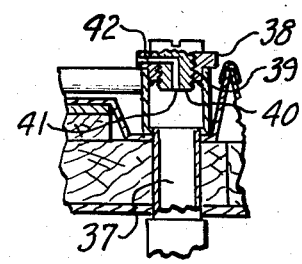
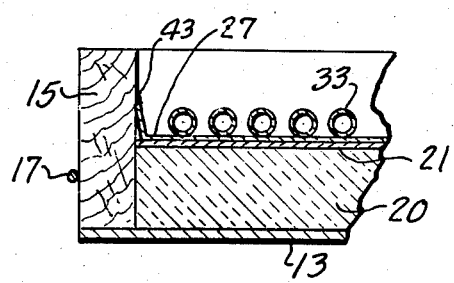
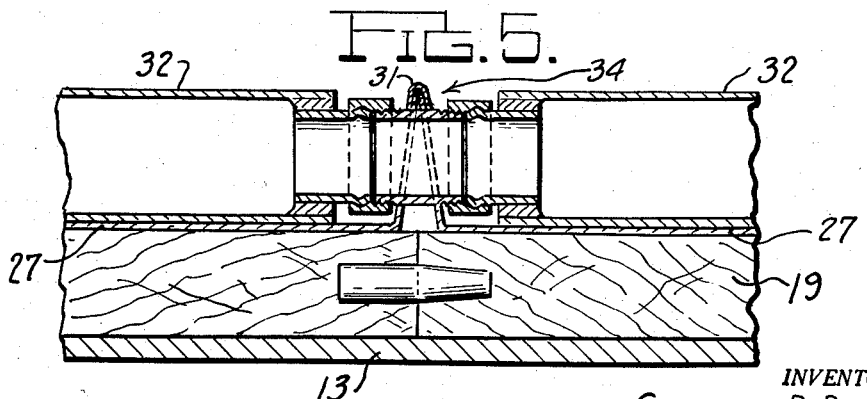
INVENTOR.
CHARLES R. BELTZ
BY
Whittemore, Hulbert & Belknap

2,874,549
Patented Feb. 24, 1959

---

2,874,549

PORTABLE ICE SKATING RINK AND METHOD OF MAKING THE SAME

Charles R. Beltz, Grosse Pointe, Mich.

Application May 19, 1954, Serial No. 430,757

6 Claims. (Cl. 62—75)

This invention relates to a portable ice skating rink and to an improved method of making the same.

It is an object of this invention to provide a portable ice skating rink composed of a relatively few compact sections capable of being readily installed to form rinks of various sizes and shapes.

It is another object of this invention to provide a portable ice skating rink having a plurality of individual trays of a size capable of being conveniently handled and having freezing units respectively supported within the trays for freezing water contained in said trays.

It is still another object of this invention to provide an ice skating rink which is economical to produce and maintain. In accordance with this invention the freezing units are in the form of flat grids enabling the use of especially shallow trays so that each tray contains only a small body of water which may be quickly frozen with equipment of relatively small capacity. After the water in the various trays is frozen, the ice in the trays is covered by a pool of water which is frozen to provide a continuous layer of ice over the trays and freezing units.

It is a further object of this invention to support the trays by heat insulating material in a manner such that the ice is effectively shielded from the ground.

The foregoing as well as other objects of this invention will be made more apparent as this description proceeds especially when considered in connection with the accompanying drawings, wherein:

Figure 1 is a plan view of a portable ice skating rink embodying the features of this invention;

Figure 2 is an enlarged sectional view taken on the line 2—2 of Figure 1;

Figure 3 is an enlarged sectional view taken on the line 3—3 of Figure 1;

Figure 4 is an enlarged fragmentary sectional view taken on the line 4—4 of Figure 1;

Figure 5 is an enlarged fragmentary sectional view taken on the line 5—5 of Figure 1; and Figure 6 is an enlarged sectional view taken on the line 6—6 of Figure 1.

The ice skating rink selected herein for the purpose of illustration is shown in Figure 1 as being rectangular in shape, although it will be understood as this description proceeds that the rink may be produced in varying shapes and sizes to suit particular specifications. In detail, the rink comprises a platform 10 and a plurality of individual sections 11 supported by the platform 10 in juxtaposition to one another.

The platform 10 corresponds in shape and size to the particular type of rink required and is supported above the ground at laterally spaced points by beams 12 of any suitable construction. As shown in Figure 3 of the drawings, the platform 10 has a base sheet 13 supported on the beams 12 and has a vertical wall 14 extending completely around the perimeter of the platform. The wall 14 is composed of frame members 15 having the bottom edges seated on the base sheet 13 and abutting spacer strips 16 which are also seated on the base sheet 13. In the present instance a cable 17 encircles the frame members 15 and the ends of the cable are connected together by a turn buckle 18 in a manner such that the frame members 16 are removably clamped against the spacer strips 16. As shown in Figure 2 of the drawings additional spacer strips 19 are supported on the base sheet 13 intermediate opposite end edges of the latter and blankets 20 of heat insulating material are seated on the base sheet 13 at opposite sides of the spacer strips 19. The blankets 20 of insulating material are respectively covered by top sheets 21 having the marginal edge portions seated on filler strips 22 which, in turn, are seated on the spacer strips 16 and 19, respectively.

The above construction is such that the filler strips 22 extending along the adjacent marginal edges of the top sheets 21 cooperate with each other and with the spacer strips 19 to provide a channel 23 extending from one side wall of the platform to the opposite side wall. Also, the filler strips 22 at the outer marginal edges of the top sheets 21 cooperate with the spacer strips 16 and with the adjacent frame members 15 to form channels 24 extending parallel to the channel 23. The purpose of these channels will be more fully hereinafter described.

The filler strips, spacer strips and frame members 15 are all formed of a heat insulating material such, for example, as wood so as to cooperate with the blankets 20 to effectively retard the transfer of heat through the platform. In practice, the filler strips may be secured to the top sheets 21 to form a unit with the latter, and the spacer strips as well as the frame members may be held in assembled relationship by the cable 17. Thus, the various parts of the platform may be readily assembled and disassembled when desired.

Each freezing section 11 comprises a tray 25 and a freezing unit 26. Each tray comprises a bottom wall 27, side walls 28 and end walls 29. The depth of the tray 25 is increased adjacent each end wall 29 by forming the bottom wall 27 with channels 30. In practice, the trays are supported in juxtaposition to one another on the platform 10 within the confines of the wall 14 and the joints between adjacent walls are sealed by strips 31 bent over the top edges of the adjacent tray walls, as shown in Figure 2 of the drawings. Also, when the trays 25 are grouped as noted above, the channels 30 at opposite ends of the trays are respectively received by the channels 23 and 24 in the platform 10.

A freezing unit 26 is supported in each tray 25 and forms an assembly with the latter. Each freezing unit 26 comprises a pair of headers 32 and a plurality of tubes 33. The tubes 33 are spaced laterally from one another in a horizontal plane and have the opposite ends respectively connected with the headers 32 adjacent the top walls of the latter. The portions of the headers 32 of each freezing unit extending below the plane of the tubes 33 respectively project into the channels 30 of the associated tray 25 and rest on the bottom walls of the latter channels. The bottom wall 27 of the tray between the channels 30 is located in close proximity to the undersides of the tubes 33, and the side walls 28 together with the wall 29 at the inner end of the tray 25 are approximately the same height as the top walls of the headers 32. Thus, the water capacity of the individual trays 25 is reduced to a minimum and is sufficient only to enable covering the tubes 33 with water. This construction is highly advantageous in that it reduces the time and capacity of the equipment required to freeze the water in any one tray 25. The end walls 29 of the trays 25 at the outer ends of the trays extend for a short distance above the headers 32 or above the remaining walls of the trays in order to provide in effect a temperature barrier adjacent the wall 14 of the platform 10.

In the present instance, provision is made for circulating refrigerant serially through the freezing units 26 in any one row. As shown in Figure 5 of the drawings, the adjacent ends of the headers 32 of the freezing units 26 in each row are detachably connected together by a coupling 34 which extends through openings formed in the adjacent walls of the trays. Thus, refrigerant introduced into the header 32 at one end of one of the freezing units 26 will flow freely into the corresponding headers of adjacent freezing units. As shown in Figure 3 of the drawings, one of the headers 32 at the outer end of a freezing unit 26 is connected to a nipple 35 which extends downwardly through the platform 10 for connection with tubing 36. The tubing 36 is in turn connected to a suitable ice making machine not shown herein. Thus, refrigerant from the ice making machine is introduced into the headers 32 at the outer ends of the freezing units 26 and flows through the tubes 33 to the headers 32 at the inner ends of the freezing units. One of the headers 32 at the inner end of a freezing unit is connected to the return side of the ice making machine by a nipple 37 (Figure 6) similar to the nipple 35 previously described. The return header 32 of each freezing unit 26 is equipped with a bleeder valve 38. As shown in Figure 6, each bleeder valve comprises a plug 39 and a valve member 40. The plug 39 extends through an opening in the header and is secured to the latter. The valve member 40 is threadably mounted in a bore extending through the plug 39 and has a fluid passage 41 extending upwardly from the bottom of the valve member. The plug 39 has an outlet port 42 registrable with the passage 41 in one rotative position of the valve member relative to the plug 39 to permit bleeding of the freezing unit at the required intervals.

Circulation of refrigerant through the freezing units 26 quickly freezes the relatively small body of water contained within the respective trays 25 and forms a layer of ice over the freezing units 26. After the water in the individual trays is frozen by the units 26, the ice is covered with an additional quantity of water of a depth sufficient to completely cover the top edges of the trays and for this purpose the side walls 14 of the platform are extended above the trays. The additional supply of water is then frozen to form a continuous surface of ice across the trays of sufficient thickness to completely cover the top edges of the tray walls. The escape of water through the joints existing between the walls 14 of the platform and the adjacent walls of the trays 25 is reduced to a minimum by filling these joints with a sealing cement or mastic 43.

It follows from the above that an ice skating rink of practically any size consistent with the capacity of the ice making machine may be readily installed by merely adding sections 11 and correspondingly increasing the size of the platform 10. It is also apparent that due to the particular design of the sections 11 it is possible to freeze the water required to form a skating rink of given size in a relatively short period of time with a freezing machine of relatively small capacity. Hence, the cost of forming and maintaining the ice is reduced to a minimum.

What I claim as my invention is:

1. The method of making an ice skating rink which comprises grouping together in juxtaposition alongside each other in a common generally horizontal plane, a plurality of relatively shallow generally dish-shaped trays each having a bottom wall and a peripheral wall extending upwardly from the margin of said bottom wall, sealing the space between the peripheral walls of adjacent trays, filling said trays with water substantially to the upper extremities of the peripheral walls thereof, freezing the water in said trays, thereafter covering the trays and ice therein with a pool of water to a level above the peripheral walls of said trays and laterally confining said pool of water, and freezing said pool of water to provide a continuous layer of ice over said trays.

2. A prefabricated ice skating rink comprising a plurality of individual sections separable from one another, each section including a generally dish-shaped relatively shallow ice tray having a bottom wall and a peripheral wall extending upwardly from the margin of said bottom wall, a water freezing unit supported within each tray, means for supplying refrigerant to said freezing units, said trays being retained together in juxtaposition alongside one another in a common generally horizontal plane, sealing means closing the space between the upper edges of the peripheral walls of adjacent trays, and a peripheral frame extending continuously and entirely around said rink and projecting upwardly above said peripheral walls of said trays to laterally confine water above the level of said peripheral walls and provide a continuous ice skating surface when such water is frozen.

3. The structure defined in claim 2 wherein each water freezing unit is in the form of a grid comprising headers respectively extending along the peripheral wall of the associated tray at opposite sides of the latter, a plurality of tubes connected to and extending between the headers in lateral spaced relationship, said tubes being located in a common horizontal plane and connected to the headers at the top of the latter, the depth of the trays between the headers being reduced.

4. The method of making an ice skating rink which comprises grouping together in juxtaposition alongside each other in a common generally horizontal plane, a plurality of relatively shallow generally dish-shaped receptacles, sealing the space between said receptacles, substantially filling said receptacles with water, freezing the water in said receptacles, thereafter covering the receptacles and ice therein with a pool of water to a level above said receptacles and laterally confining said pool of water, and freezing said pool of water to provide a continuous layer of ice over said receptacles.

5. A prefabricated portable ice skating rink comprising a plurality of individual, readily separable generally dish-shaped relatively shallow ice trays each having a bottom wall and a peripheral wall extending upwardly from the margin of said bottom wall, said trays being retained together in juxtaposition alongside one another in a common generally horizontal plane in an arrangement dependent upon the size and shape of rink desired, water freezing means associated with said trays for freezing water contained therein, sealing means closing the space between the upper edges of the peripheral walls of adjacent trays, and a removable border frame extending continuously and entirely around said rink and projecting above said peripheral walls of said trays to laterally confine water above the level of said peripheral walls and provide a continuous ice skating surface when such water is frozen.

6. A prefabricated portable ice skating rink as defined in claim 5 in which the upper edges of the peripheral walls of the trays lie in a common horizontal plane.

References Cited in the file of this patent

UNITED STATES PATENTS

| | | |
|---|---|---|
| Re. 16,543 | Funk | Feb. 8, 1927 |
| 515,979 | De Stoppani | Mar. 6, 1894 |
| 2,217,083 | Vetter | Oct. 8, 1940 |
| 2,270,745 | Todd | Jan. 20, 1942 |
| 2,469,021 | Vetter | May 3, 1949 |
| 2,615,308 | Thorns | Oct. 28, 1952 |
| 2,642,679 | Zamboni | June 23, 1953 |
| 2,732,688 | Dickson | Jan. 31, 1956 |

FOREIGN PATENTS

| | | |
|---|---|---|
| 2,239 | Great Britain | 1875 |